INVENTORS
JOHN F. LYNCH
RAYMOND A. NICHOLS
BY
ATTORNEYS

United States Patent Office 3,356,461
Patented Dec. 5, 1967

3,356,461
CONDENSATE DOME FOR CONTINUOUS
CHEMICAL REACTORS
John F. Lynch, Chester, Pa., and Raymond A. Nichols, Wilmington, Del., assignors to Marco Development Co., Inc., Wilmington, Del., a corporation of Delaware
Filed Apr. 26, 1965, Ser. No. 450,807
2 Claims. (Cl. 23—290.5)

This invention relates to chemical reaction apparatus for facilitating continuous reactions, heat exchange, mixing, cooking and other chemical processes in which it is necessary to maintain accurate and continuous control of the product during such processing and more particularly to provide an improved condensate dome for this chemical reactor which removes gases and/or vapors from the product during processing.

A typical chemical reactor may be similar to the one described and claimed in U.S. Patent No. 2,944,877 entitled, Chemical Apparatus for Continuous Reactions, Heat Exchange, Mixing, Cooking and Other Chemical Processes. This continuous reactor consists of a plurality of chambers with an impeller disposed in each, each of said chambers, being separated by a heat exchange surface through which the reacting material must pass. The individual surfaces and chambers are bolted together alternately to form one continuous reactor. The impellers provide the pumping action to move the product through the apparatus and heat exchange surfaces supply the necessary heat for effecting the reaction. Thus, the reaction of the materials is complete by the time the charge reaches the opposite end of the reactor where the product is withdrawn. Depending on the time and temperature needed the reactor can be assembled with as many impeller chambers and heat exchange surfaces as are necessary.

In many chemical reactions gases or vapors are generated which if left in the reactor will be undesirable as they tend to increase the pressure and prevent the free passage of the product, or else they will affect the physical consistency of the material such as its viscosity, clarity, color, etc. In addition by-products may also be formed which would be undesirable in that they might inhibit the completion of polymerization or chemical reaction. The by-products may also be undesirable relative to the chemical purity of the product, and thus it may be desired to separate these undesirable by-products by converting them to a vapor and subsequently removing them in their vaporous state. It may also be desired to selectively separate desired materials by converting them to the vaporous state and removing the same leaving the undesirable materials in the reactor.

Accordingly, many types of continuous reactors have been proposed and utilized which have incorporated therein means for the removal of these gases and vapors. A dome was often used to remove these vapors, but the dome had to have access to the interior of the continuous reactor and the only place this was feasible in prior art continuous reactors was above one of the impeller chambers. These domes proved inefficient in their removal of gases because the action of the dome only operated on the little amount of material which was exposed in the impeller chamber. It did not reach beyond this into other areas of the reactor as the adjacent heat exchange plates effectively blocked the passage of the vapors. The impeller was needed in the chamber to keep the charge of material moving and as this took up most of the space there was little left for the material upon which the action of the dome could operate. The impeller not only prevented a large amount of material from being exposed but it also inhibited the free escape of the gases and vapors which were being generated. In addition, it threw parts of the solid reaction material up into the dome unless it was operated at a very slow speed.

The vapors which were removed by this dome took off heat with them thus creating a loss of heat in the reaction chamber. These vapors often recondensed in the dome and ran back into the mixture in the form of a liquid. It can thus be seen that little vapor was effectively removed from the continuous reactor by these prior art condensate domes.

Accordingly it is an object of this invention to construct an improved condensate dome which will expose a larger area of material to the action of the dome so as to effectively remove all the gases and vapors from the reactor.

It is a further object of this invention to construct the dome which comprises part of a complete cylindrical section or plate for the continuous reactor wherein the presence of an impeller is not required.

It is another object of this invention to provide a condensation cylinder section with a condensate dome attached which can readily be positioned anywhere along the continuous reactor for maximum removal of all gases and vapors.

It is an additional object of this invention to provide a condensation cylinder section which will replace to the reaction mixture any heat loss occasioned by removal of the gases or vapors.

It is a further object of this invention to provide a condensate dome which will prevent condensation of any of the withdrawn vapors within the dome itself thus preventing their re-entry into the reaction mixture in liquid form after they have been removed as a vapor.

These and other objects will become apparent from the following description of the drawings.

With reference to the figures there is shown a continuous chemical reactor similar to the one described in the aforementioned U.S. patent which may suitably be connected to a source of power output not shown controlled by variable speed transmission.

Figure 1:
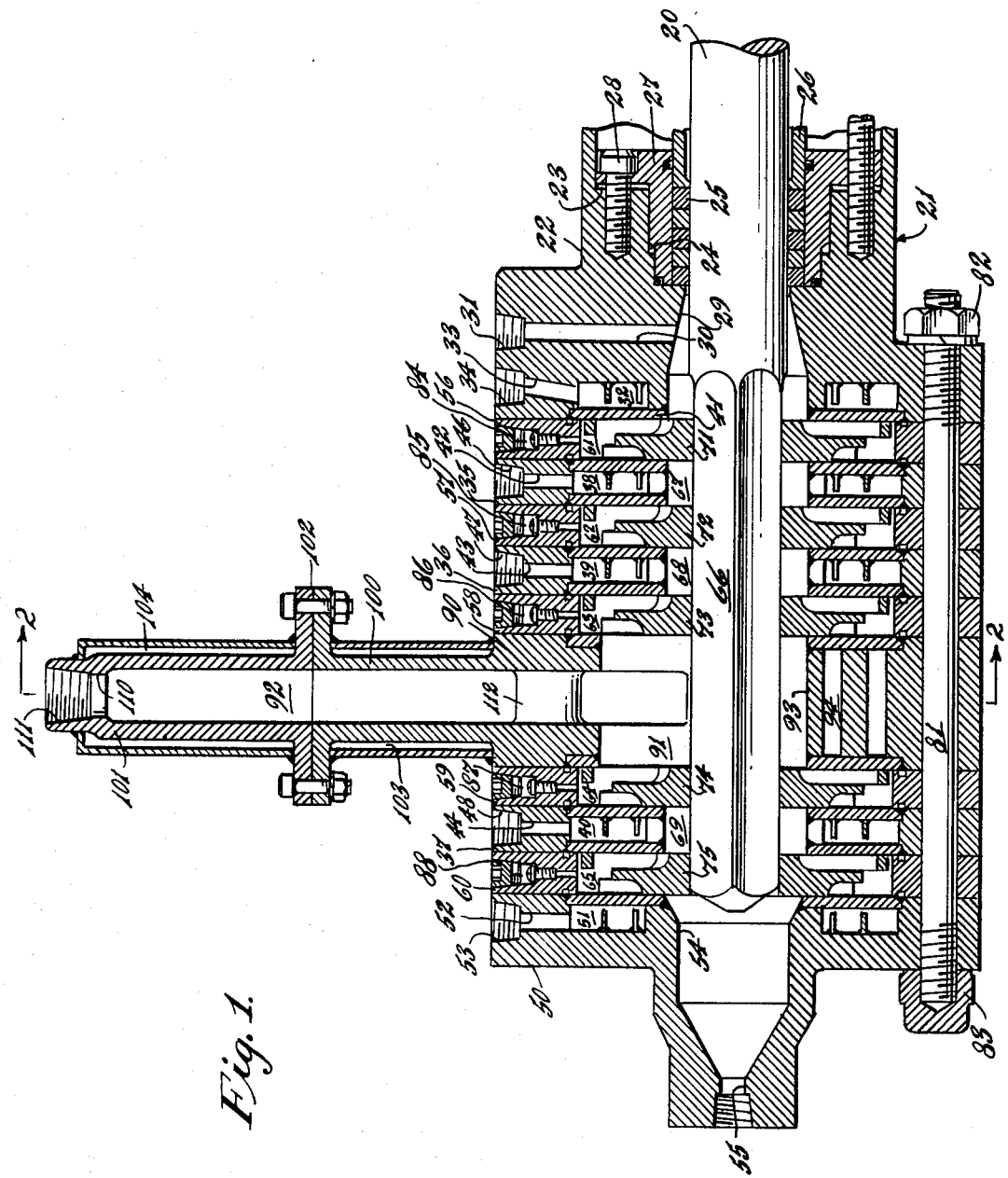
FIGURE 1 is a longitudinal sectional view taken along the lines 1—1 of FIGURE 2 showing a reactor constructed of a plurality of impeller chambers interspersed with heat exchange plates with the cylindrical condensation section or vapor outlet plate with dome attached positioned between two impeller chambers.

This power is coupled to impeller drive shaft 20 which may be rotatably supported in a seal housing 21 only part of which is shown in FIGURE 1. The interior of the center portion 22 of the housing 21 is hollow and terminates in a shoulder 23 with an annular recess 24 provided adjacent the shaft 20. This recess 24 is provided with sealing rings 25 which are held in place by gland ring 26, part of which is shown in FIGURE 1. A filler ring 27 is also positioned in the recess 24 and such filler ring may be removed as desired in order to accommodate sealing rings of different size or configuration. The seal housing 21 is also provided with an annular recess 29 adjacent the shaft 20 and communicating with this recess is material supply bore 30 in the housing 21. This terminates in a screw threaded opening 31 to which may be attached a suitable material supply conduit.

The reactor portion of the apparatus comprises an annular passage 32 within housing 21 for receiving a heat exchange fluid which is communcated to the passage through bore 33, having means 34 for attaching a conduit thereto. Additionally the reactor consists of a plurality of axially spaced heat exchange plates 35, 36 and 37, and as clearly shown each of these plates is provided with an annular passage 38, 39 and 40 for receiving a heat exchange fluid. Bores 42, 43 and 44 communicate with the passages 38, 39 and 40, respectively, and such bores are provided with threaded openings 46, 47 and 48 for receiving conduits. Outer end plate 50 is also provided with an annular passage 51 therein for receiving a heat exchange fluid and a bore 52 in the end plate 50 communicates with the passage 51 and is provided with means 53 for attaching a conduit thereto. The end plate 50 is provided with an annular recess 54 on the inner surface and located centrally thereof and communicating with the recess 54 is material discharge bore 55. Either end of the reactor may be used for charging or discharging depending on the direction of rotation of the shaft 20.

Spacer ring 56 separates heat exchange plate 35 from inner end plate 41 which plate comprises part of and is integral with the seal housing 21. Spacer 57 separates heat exchange plates 35 and 36 with spacers 58 and 59 separating heat exchange plates 36 and 37 respectively, from the condensation cylindrical section or vapor outlet plate 90. Spacer ring 60 separates the heat exchange plate 37 from the outer end plate 50. The spacer rings 56, 57, 58, 59 and 60 may be provided with bores 84, 85, 86, 87 and 88 respectively, which communicate with the impeller chambers 61, 62, 63, 64 and 65 for the purposes of supplying additives to the reaction mixture. While the bores are shown in all the plates, it is to be understood that such bores may be provided for in only one of the spacers or in any number thereof to supply additives wherever desired throughout the reactor. The heat exchange fluid passages 32, 38, 39, 40 and 51 may suitably be connected together so that a particular temperature may be accurately controlled in all of the heat exchange plates.

It is to be noted that the inner diameters of the spacer rings 56, 57, 58, 59 and 60 are greater than the inner diameters of the heat exchange plates 35, 36 and 37 which serve to provide impeller receiving chambers 61, 62, 63, 64 and 65 between the heat exchange plates and between the heat exchange plate 35 and the inner end plate 41 and between the heat exchange plate 37 and the outer end plate 50. The shaft 20 projects through the inner end plate 41 and is surrounded by the heat exchange plates and spacer rings as shown in FIGURE 1. The shaft 20 terminates within the annular recess 54 and the outer end plate 50 and the portion 66 of the shaft 20 between the inner end plate 41 and outer end plate 50 is polygonal in cross section. The inner diameter of each of the heat exchange plates 35, 36 and 37 is greater than the diameter of the polygonal portion 66 of the shaft 20 in order to provide annular material passages 67, 68 and 69 between the impeller receiving chambers.

Figure 2:
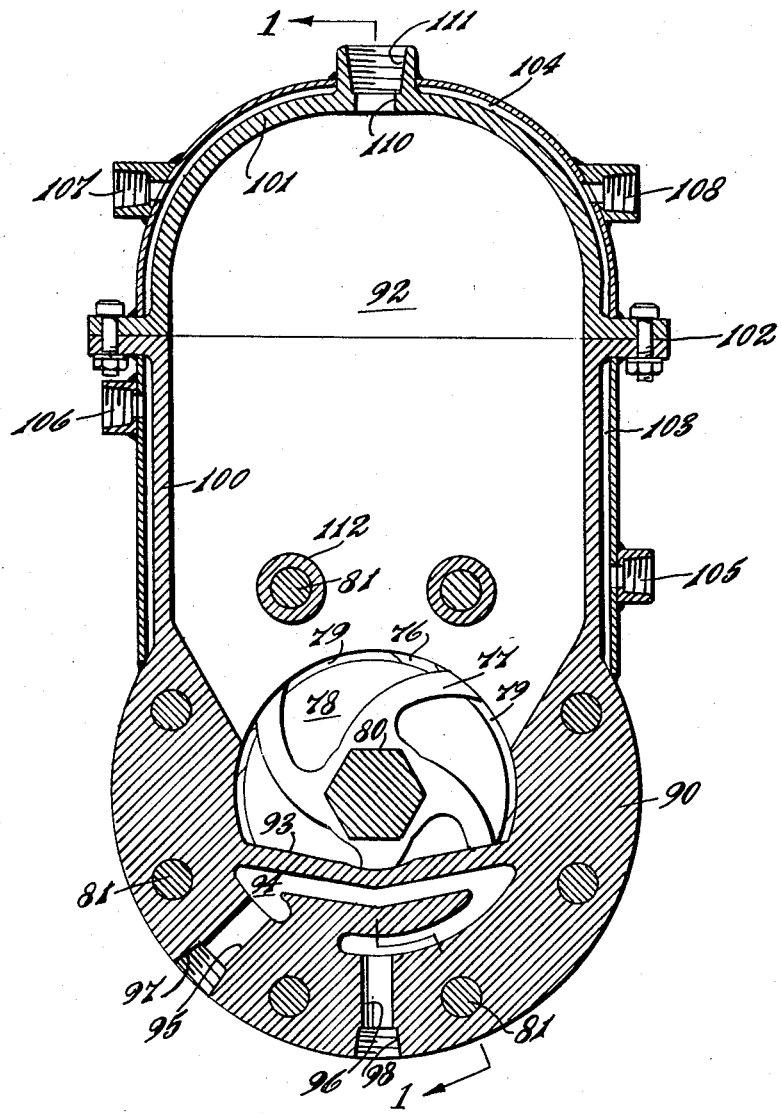
FIGURE 2 is a sectional view taken along the lines 2—2 of FIGURE 1 showing the condensate dome and vapor outlet plate.

Impellers 71, 72, 73, 74, 75 are disposed in the impeller chambers 61, 62, 63, 64, 65 respectively and as best shown in FIGURE 2 each of these impellers comprises a set of radially extending vanes 76 and 77 which are separated by a disc 78 the diameter of which is less than the diameter of the vanes 76 and 77 in order to provide a material passage 79 from one side of the disc 78 to the other. Centrally of the impeller there is provided a polygonal aperture 80 for slidably and non-rotatably mounting the impellers on the polygonal portion 66 of the shaft 20, and as shown in FIGURE 1 the impellers are disposed in spaced relation according to the spacing of the impeller chambers 61, 62, 63, 64, and 65.

Between impeller chambers 63 and 64 is conveniently placed a condensate cylinder section or vapor outlet plate 90. It is to be understood that this or any number of outlet plates may be placed between any two impeller chambers in the reactor in lieu of a heat exchange plate. However, it is necessary to have at least one impeller chamber section beyond the position of the vapor outlet plate so the material can be pulled through the plate and out the discharge bore. The vapor outlet plate 90 comprises a relatively large cavity 91 in its center portion through which impeller shaft 20 passes. This cavity communicates directly with a condensate dome 92 which allows gases or vapors to accumulate in a space above the reaction area as shown in FIGURE 2. It is to be noted that the bottom 93 of the cavity 91 is approximately of the same diameter as the inner diameter of the heat exchange plates and not that of the impeller chambers and that its top is open to the condensate dome 92. This raised bottom prevents material from being trapped as it passes from impeller chamber 63 through the plate 90 and into the impeller chamber 64. The bottom 93 of the cavity 91 slopes toward the center to form a trough and therefore any material remaining therein will run off into the adjacent impeller chambers. In addition, the vapor outlet plate 90 has annular chamber 94 for receiving a heat exchange fluid which is communicated to the passage through bores 95 or 96 having means 97 and 98 respectively to attach a conduit thereto. This heat exchange surface provides additional heat to the reaction at the exact point where most of it is lost in the escaping vapors. In this way the temperature of the reaction product is more accurately controlled.

The condensate dome consists of a lower half 100 which is part of the vapor outlet plate 90 and a top half 101 suitably affixed thereto at 102, the two halves comprising the dome. This dome is jacketed with a heat exchange passage 103 in its lower half, the heat exchange fluid being communicated through ports 105 and 106, and jacketed by a passage 104 in its upper half the heat exchange fluid being communicated through ports 107 and 108. The top of the condensate dome is provided with an outlet passage 110 having means 111 to attach a conduit thereto. A reduced pressure or partial vacuum may be connected to the outlet passage to aid in the withdrawal of the vapors and gases from the condensate dome in continuous manner. The condensate dome provides a space for the accumulation of gases before they are withdrawn and it is jacketed with the heat exchange passages to prevent the condensation of the vapors and gases while in this area. After the vapors are withdrawn from the dome they are recondensated and recovered by any suitable means.

The heat exchange plates, spacer rings, inner end plate 41, vapor outlet plate 90 and outer end plate 50 are assembled in axial relationship concentric with the polygonal portion 66 of the shaft 20. All of these plates may be conveniently secured together by an elongated screw threaded fastening means or the like 81 extending therethrough, and provided on opposite ends with nuts 82 and 83 or with any other suitable fastening means. Consequently, it will be seen that merely by removing either of the nuts 82 and 83 and the fastening means 81 that the entire reactor portion of the apparatus may be conveniently disassembled for cleaning or repair purposes. The bolts 81 are provided with suitable shields 112 integrally connected with the vapor outlet plate 90 to prevent their exposure to the vapors or gases flowing by them.

In operation and with the impellers 71, 72, 73, 74 and 75 rotating at the desired speed, material is introduced to the reactor through the material supply bore 30 and the annular recess 29 in the inner end plate 41 and such material is moved by the vanes 76 on the impeller 71 outwardly along the surface of the inner end heat exchange plate 41. Such material then flows through the passage 79 to the opposite side of the disc 78 and is carried radially inwardly by the vanes 77 on the impeller 71. As such material is carried inwardly the same moves in a thin film across the face of the heat exchange plate 35 and either gives up or receives heat from the heat exchange fluid present in the passage 38 of the heat exchange plate 35. From the vanes 77 of the impeller 71 the material flows through the annular passage 67 between the heat exchange plate 35 and the shaft 20 and is moved outwardly by the vanes 76 on the next impeller 72 along the opposite face of the heat exchange plate 35 in the thin film to impart or receive heat therefrom. The material continues to flow through the entire reactor in the same manner from one side of the disc 78 of each impeller to the other until such time as the material reaches the recess 54 in the end plate 50, at which time it is discharged through the material discharge bore 55. Due to the flow of the material in the thin film along the opposite faces of each impeller chamber the temperature of the material in that chamber may be accurately controlled as desired and furthermore, additives may be introduced into one or more of the chambers through the additive supply bores 84, 85, 86, 87 and 88 as fully described above. It will be noted that the impellers disposed in the impeller chambers act to thoroughly agitate and mix the material and at the same time operate as pump impellers in order to move the material through the reactor.

When the material enters impeller chamber 63, while it is in the cavity 91 and before it leaves the impeller chamber 64, it is subjected to the vacuum applied to the condensate dome. This vacuum not only pulls out gases and vapors which have accumulated in the dome but also pulls vapors from the material which has been exposed in the cavity 91. In addition, the vacuum reaches beyond this and into the adjacent impeller chambers 63 and 64 and removes vapors from these areas also. In this way a greater amount of vapor is withdrawn from the reaction mixture per unit time than when the dome was affixed above an impeller chamber according to prior art devices. In the prior art devices the vacuum only pulled gases and vapors from the material in the impeller chamber and not from the adjacent areas as these were blocked by the heat exchange plates. Consequently, little, if any, vapor was removed from the reaction mixture by any one of these domes.

However, by providing a cylindrical section with a relatively large cavity therein as one of the plates of the reactor and placing it between two adjacent impeller chambers in lieu of a heat exchange plate, the vacuum in the dome is able to remove the vapors not only from two chambers instead of from one but in addition from all the material which is now exposed in the cavity. Because the section or vapor outlet plate is placed between two impeller chambers it is unnecessary to have an impeller within the cavity to keep the material moving through the reactor. Thus with the impeller eliminated much more material can be exposed to the action of the dome and in addition there will be no tendency to throw solid material up into the dome.

Thus the invention provides an efficient and practical means for the effective removal of vapors or gaseous material from a chemical reaction mixture. After its removal as a vapor it may be condensed and recovered if it is a desirable material or discarded if it is undesirable. However, many times during the withdrawal of the undesirable material in a vaporous form there may not be a complete separation and some desired material may also be withdrawn. Thus the invention may utilize additional equipment such as a reflux condenser or the like in order to effectuate preparation of the vapors after they have been removed from the dome. In addition to removing undesirable by-products the condensate dome may also be used to remove water from a material as a vapor thus dehydrating it, or it may be used to remove air thus deaerating it. In chemical reactions a gas may be used to utilize or scavenge impurities and this device allows the gases with entrained impurities to be removed. Subsequently, the impurities are removed from the gas, the gas recovered and recycled to the reaction, thus maintaining it on a continuous basis.

It will be seen that by the above described invention there has been provided a chemical apparatus which may be utilized to carry out various chemical processes under accurate control conditions and in which thorough and rapid mixing may be accomplished in order to facilitate such reactions with improved means for efficiently and swiftly removing any vapors or gases which are present or have been generated in the reaction mixture. Furthermore, the apparatus may be conveniently manufactured for use in laboratories and thereafter duplicated in an enlarged scale for use in production.

In view of our invention and disclosure variations and modifications to meet individual whim or particular need will doubtless become evident to others skilled in the art, to obtain all or part of the benefits of our invention without copying the apparatus shown, and we therefore claim all such insofar as they fall within the reasonable spirit and scope of our invention.

Having thus described our invention what we claim as new and desire to secure by Letters Patent is:

1. Chemical reaction apparatus comprising a shaft, a housing surrounding the shaft made up of a series of in-line impeller chambers and a series of heat exchange plates interposed between the impeller chambers and providing material flow passages therein for advancing material through the chambers and adjacent heat exchange plates, impellers mounted on the shaft, rotatable with it, positioned in the respective impeller chambers, the impellers feeding a liquid material outwardly on one side and inwardly on the other side, in combination with a vapor outlet plate interposed between two impeller chambers, having an interior opening surrounding the shaft in spaced relation to form a vapor chamber free from any impeller, heat exchange passages in the radially inner wall of the vapor outlet plate for heating the interior of the vapor outlet plate which is exposed to the liquid material of the reaction apparatus, the vapor chamber communicating with the impeller chambers on either side thereof, a condensate dome connected with the vapor outlet plate and with the interior of the vapor chamber, extending above the reactor housing, and means for creating a partial vacuum within the condensate dome for withdrawing vapor therefrom.

2. A device according to claim 1, in combination with heat transfer passages in the condensate dome to prevent condensation of vapors therein.

References Cited

UNITED STATES PATENTS

| 2,833,750 | 5/1958 | Vickers | 264—102 |
| 2,944,877 | 7/1960 | Marco | 23—290.5 |
| 3,047,368 | 7/1962 | Marco | 23—290.5 X |

JOSEPH SCOVRONEK, *Acting Primary Examiner.*

JAMES H. TAYMAN, JR., *Examiner.*